(12) United States Patent
Lanfranchi

(10) Patent No.: US 7,261,512 B2
(45) Date of Patent: Aug. 28, 2007

(54) MACHINE FOR ORIENTING ALIGNING VESSELS OR BOTTLES MADE OF PLASTICS

(75) Inventor: Mario Lanfranchi, Collecchio (IT)

(73) Assignee: Lanfranchi S.R.L., Colecchio (IT)

( * ) Notice: Subject to any disclaimer, the term of this patent is extended or adjusted under 35 U.S.C. 154(b) by 0 days.

(21) Appl. No.: 10/415,879

(22) PCT Filed: Aug. 21, 2002

(86) PCT No.: PCT/EP02/09333

§ 371 (c)(1),
(2), (4) Date: May 1, 2003

(87) PCT Pub. No.: WO03/022714

PCT Pub. Date: Mar. 20, 2003

(65) Prior Publication Data

US 2005/0100433 A1    May 12, 2005

(30) Foreign Application Priority Data

Sep. 6, 2001   (IT) ................... PR2001A0058

(51) Int. Cl.
  B65G 47/24   (2006.01)
  B65G 15/00   (2006.01)
  B65G 17/00   (2006.01)
  B65G 29/00   (2006.01)
(52) U.S. Cl. .................. 414/754; 414/773; 198/382; 198/399; 198/404

(58) Field of Classification Search ................ 414/754, 414/755, 773; 198/377.02, 382, 399, 404
See application file for complete search history.

(56) References Cited

U.S. PATENT DOCUMENTS

| | | | | |
|---|---|---|---|---|
| 3,338,373 A * | 8/1967 | Aidlin et al. | ........... | 198/397.05 |
| 3,543,909 A * | 12/1970 | Kazou | ........... | 198/392 |
| 3,662,872 A * | 5/1972 | Nalbach | ........... | 198/397.05 |
| 4,130,194 A * | 12/1978 | Schindel et al. | ........ | 198/397.02 |
| 4,798,277 A * | 1/1989 | Dubuit et al. | .......... | 198/397.05 |
| 4,825,995 A * | 5/1989 | Nalbach | ........... | 198/380 |
| 4,979,607 A * | 12/1990 | Fogg | ........... | 198/392 |
| 5,065,852 A * | 11/1991 | Marti | ........... | 198/392 |
| 6,591,964 B1 * | 7/2003 | Lanfranchi | ........... | 198/399 |

* cited by examiner

Primary Examiner—Gene O. Crawford
(74) Attorney, Agent, or Firm—Shlesinger Fitzsimmons

(57) ABSTRACT

The invention falls within the field of machines for orienting and aligning vessels or bottles made of plastics randomly inserted into a load vessel and in particular to a type of orienting and aligning machine that provides a plurality of elevators (6) that are vertically sliding along the internal wall of a rotating cylinder (1) containing randomly-placed bottles. More precisely, it refers to a device for automatically adjusting the size of the plurality of elevators placed inside the rotating cylinder depending on bottle size or format. The device provides a plurality of reduction elements (9), at least one for each elevator (6), each reduction element being inserted into the elevator without projecting and can go out of the elevator. Control means are provided for making the reduction elements go out simultaneously or sequentially.

8 Claims, 3 Drawing Sheets

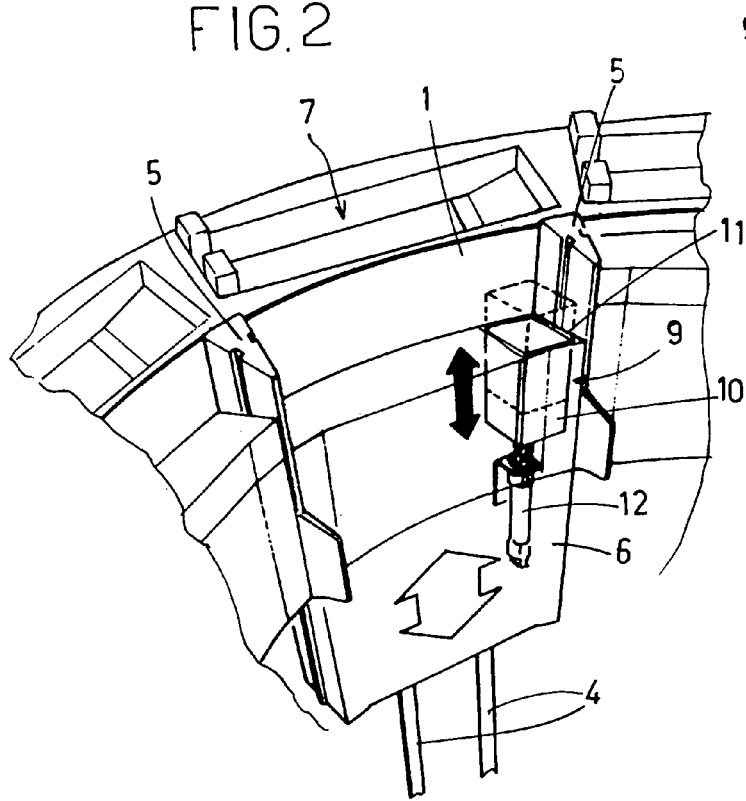
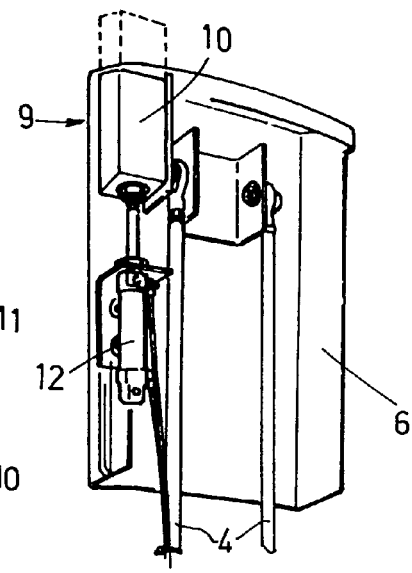

MACHINE FOR ORIENTING ALIGNING VESSELS OR BOTTLES MADE OF PLASTICS

Object of the present invention is a machine for orienting and aligning vessels or bottles made of plastics.

In particular, the present invention refers to a type of orienting and aligning machine that provides a rotating cylinder vessel in which bottles are randomly inserted.

The vessel base is tapered and can be fixed or rotating to enable rolling the vessels towards the internal wall of the cylinder vessel.

The bottles are taken to the flatwise position next to the upper edge of the rotating cylinder container where they roll or slide into orienting and aligning means arranged outside the rotating cylinder vessel in an hollow space between the rotating cylinder vessel and an external fixed cylinder wall.

The vessels are taken to the flatwise position up to the upper edge of the rotating cylinder vessel by a plurality of elevators arranged between the tapered base and the internal wall of the cylinder vessel and said elevators are vertically moving from a loading position that is slightly lower than the tapered base to a vessel-unloading position that is slightly higher than the upper edge of the rotating cylinder vessel.

The elevators, in addition to vertically oscillating, rotate with the rotating cylinder vessel.

Each elevator is substantially composed of a box-shaped element whose vertical section is shaped as a reverse "L" wherein the vertical and horizontal sections of the "L" are mutually arranged at an acute angle.

The elevators vertically slide by being guided by profiles applied to the internal wall of the rotating cylinder vessel, said profiles having to be spaced by a length that is slightly greater than the height of the plastics vessel or bottle.

The elevators are driven by known means comprising for example a fixed ring cam that moves a plurality of levers connected to the elevators.

The above orienting and aligning means, that receive plastics bottles or vessels coming from the elevators, are fixed onto the external wall of the rotating cylinder vessel.

The above briefly described machine, that is better disclosed in IT-A-1,253,395, must be able to be used for different formats of plastics bottles or vessels, namely for vessels with different capacity, different height and different shape.

Machines are already known that provides for the manual or automatic intervention on orienting and aligning means depending on the plastics bottle format, but no machines have so far been realised where it is provided to automatically modify the elevators depending on said format, where modifications have been realised with manual interventions.

The elevator reduction is particularly felt when changing the bottle format from two liters to one and a half liters to half-liter bottles whose height is substantially halved.

In this case, the elevator could simultaneously convey two bottles upwards, bringing about the clogging of orienting and aligning means. Object of the present invention is automatically providing for the reduction of the elevator receiving capacity, such elevator being arranged for the maximum size, to be adapted to the plastics vessel or bottle format.

This object is fully reached by the orienting and aligning machine of the present invention that is characterised by the features of the claims that follow and particularly in that it provides for a device to automatically adjust the elevator size comprising a plurality of reduction elements, at least one for each elevator, housed inside the elevator and adapted to vertically go out of the elevator itself after having been driven therefor by lifting means that simultaneously or sequentially operate, in order to reduce the elevator receiving capacity.

These and other features will be better pointed out by the following description of a preferred embodiment, shown, as a purely non-limiting example, in the enclosed drawings in which:

FIG. 2 is a front perspective view that shows an elevator comprising a reduction portion according to the present invention;

FIG. 3 shows the elevator in FIG. 1 in another perspective view;

Figure 1:
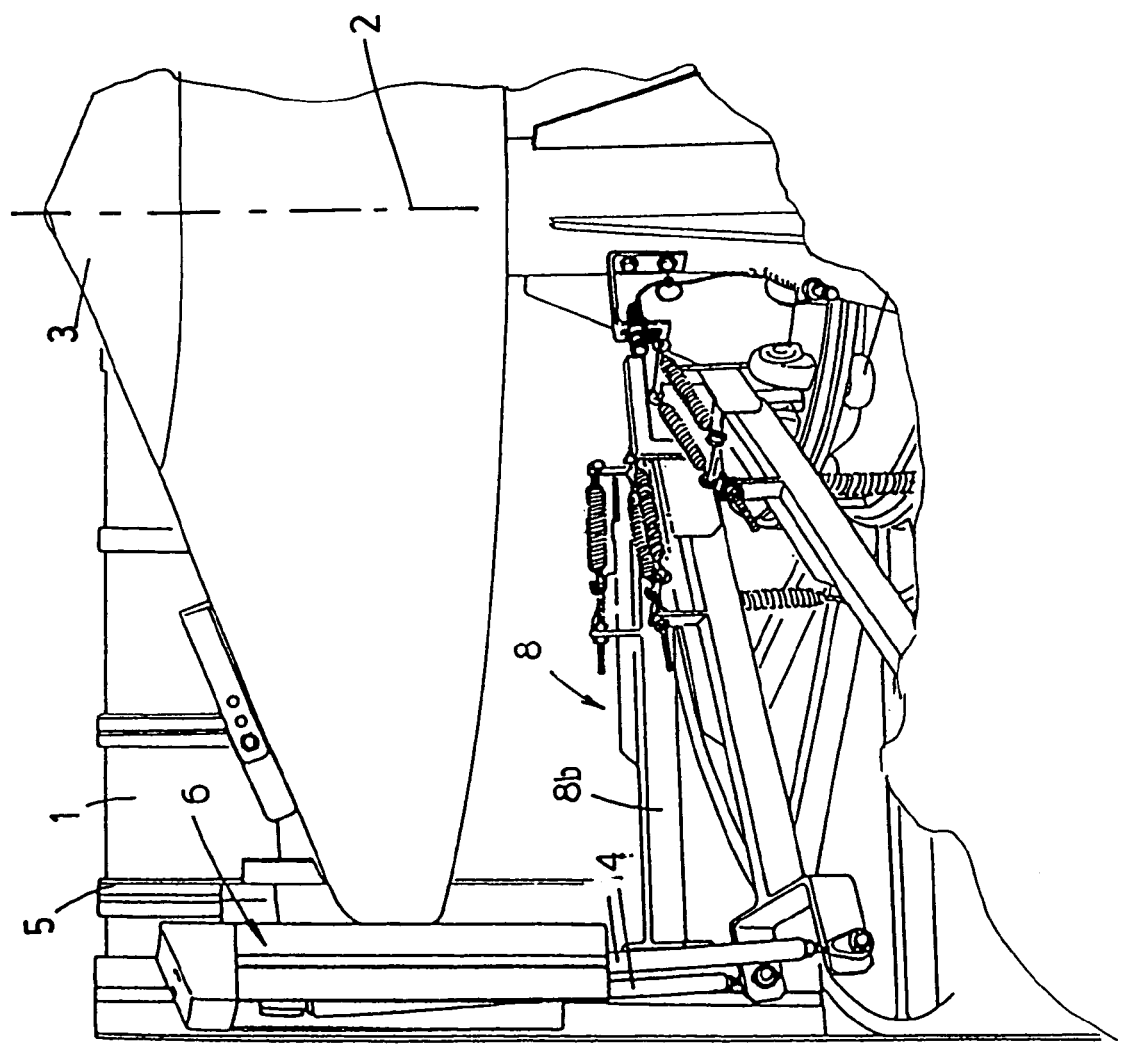
FIG. 1 is a perspective view that shows a portion of the orienting and aligning machine of the type with elevators.

With reference to FIG. 1, the orienting and aligning machine is of the type comprising a rotating cylinder vessel 1 in which bottles are randomly inserted through a conveyor belt of a type that is known and not shown.

The rotating cylinder vessel is made rotate by known means, around a vertical axis 2. Reference number 6 designates an elevator that is vertically sliding along guides 5 integral with the rotating cylinder vessel 1.

Reference number 3 designates a tapered base of the vessel 1 that could be fixed or rotating or counter-rotating with respect to the cylinder vessel 1.

The elevator 6, that is part of a plurality thereof arranged along the internal face of the vessel 1, is moved by a pair of connecting rods 4 hinged to an arm 8a of a lever 8 oscillating around a fulcrum after having been driven by cam means of a known type that are not described.

Every elevator is composed of a box-shaped element with reverse "L"-shaped longitudinal section and with its upper side forming an acute angle with the vertical side in order to enable the bottle to roll or slide into orienting and aligning means 7, of a known type, placed outside the rotating cylinder vessel 1.

As can be better seen in FIGS. 2 and 3, a device to automatically adjust the transverse size of the elevator is housed inside every elevator 6.

Such device comprises a reduction element 9 composed of a box-shaped element 10 placed on the left or right side of the elevator (on the right side in the example shown) next to an opening 11 obtained in the upper slanted face of the elevator.

The upper face of the reduction element has the same slant as the elevator in order not to create obstacles or steps when it is completely contained inside the elevator itself.

The reduction element 9, that can be completely contained into the elevator, is integral with the stem of a pneumatic cylinder 12 integral with the internal elevator face so that such reduction element vertically oscillates with the elevator and moreover can be vertically moved in a steady position outside the elevator, as shown with dashed lines, in order to reduce the elevator receiving capacity after being driven by the related pneumatic cylinder.

Figure 4:
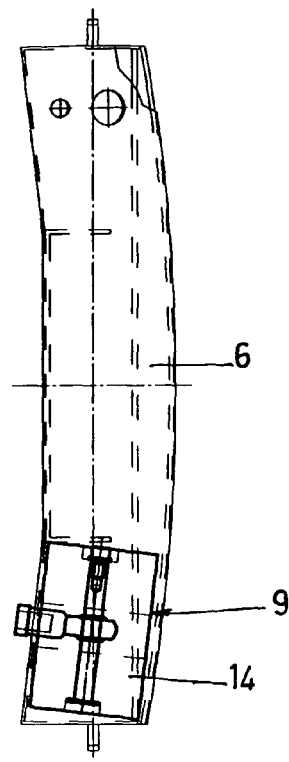
FIG. 4 shows the elevator in a plan view according to a possible variation thereof.
Figure 5:
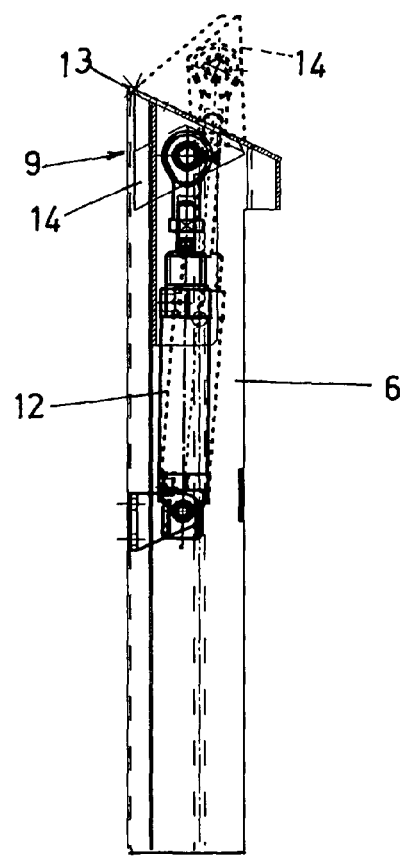
FIG. 5 shows the elevator in FIG. 4 in a side view.

With reference to FIGS. 4 and 5, a further embodiment will now be described in which the reduction element 9 is composed of a box-shaped element 14 with a triangular section with an edge hinged to a rotation pin 13 placed on the elevator so that the pneumatic piston 12 thrust makes the reduction element rotate upwards around pin 13 instead of a translation like in the previously-described embodiment.

Obviously, two coupled reduction elements could also be provided for every elevator in order to have also two reduction chances depending on the plastics bottle format.

According to a further embodiment, not shown, the reduction element could be placed in the elevator centre to create two equal and halved bottle-receiving spaces.

The pneumatic cylinders that drive the reduction elements rise or descent will be connected through hoses to a central rotating distributor in the machine and could all be simultaneously or sequentially driven.

All pneumatic cylinders are means for lifting and lowering the reduction elements and could also be hydraulic means or even completely mechanical or electromechanical means.

Instead of providing for a pneumatic piston for every reduction element, a single piston or a single mechanical or electromechanical actuator could be provided, that operates on a ring connecting a plurality of vertical rods, each one of which is connected to a respective reducing element.

What is claimed is:

1. Machine for orienting and aligning plastics vessels of a type comprising: a cylinder vessel (1) rotating around a vertical axis in which plastic vessels are randomly inserted, internally provided with a fixed or rotating tapered base (3) in order to enable the plastics vessels to roll towards an internal side wall of the rotating cylinder vessel; orienting and aligning means for the plastics vessels placed outside the rotating cylinder vessel in an hollow space between the rotating vessel and a fixed external cylinder wall coaxial thereto; a plurality of elevators (6) arranged between the tapered base and the internal side wall of the rotating cylinder vessel and integrally rotating with the vessel and vertically moving from a loading position that is slightly lower than the tapered base to an unloading position that is slightly higher than the cylinder vessel edge in order to take the plastics vessels to slide into the orienting and aligning means, characterised in that it provides for a device to automatically adjust a size of the plurality of elevators depending on a bottle format comprising, for every elevator, at least one reduction element (9), housed inside the elevator and adapted to vertically go out of the elevator itself after being driven therefor by lifting means that simultaneously or sequentially operate on said reduction elements, in order to reduce the elevator receiving capacity depending on the plastics vessels format.

2. Machine according to claim 1, characterised in that for every elevator (6) two reduction elements (9) are provided, each one of which is equipped with its own lifting means.

3. Machine according to claim 1, characterised in that every reduction element (9) is placed on a right side or on a left side of the elevator (6).

4. Machine according to claim 1, characterised in that for every elevator a central reduction element is provided that divides the elevator receiving capacity into two equal parts.

5. Machine according to claim 1, characterised in that the lifting and lowering means of the reduction elements (9) are composed of pneumatic cylinders (12) supported by their respective elevators (6).

6. Machine according to claim 1, characterised in that the reduction element is composed of a box-shaped element (10) that is substantially shaped as a prism and is connected to the pneumatic cylinder (12) so as to vertically translate.

7. Machine according to claim 1, characterised in that the reduction element is composed of a box-shaped element (14) with triangular section with an edge hinged to the elevator so that the pneumatic cylinder (12) thrust makes the box-shaped element rotate upwards.

8. Machine according to claim 1, characterised in that the lifting means that simultaneously or sequentially operate on the reduction elements are of an hydraulic or mechanical or electromechanical type.

* * * * *